(12) United States Patent
Chen

(10) Patent No.: US 10,077,997 B2
(45) Date of Patent: Sep. 18, 2018

(54) WET GAS FLOW MEASURING METHOD AND APPARATUS

(71) Applicant: Haimo Technologies Group Corp., Gansu (CN)

(72) Inventor: Jige Chen, Gansu (CN)

(73) Assignee: HAIMO TECHNOLOGIES GROUP CORP., Lanzhou, Gansu (CN)

( * ) Notice: Subject to any disclaimer, the term of this patent is extended or adjusted under 35 U.S.C. 154(b) by 789 days.

(21) Appl. No.: 14/416,265

(22) PCT Filed: Jul. 24, 2013

(86) PCT No.: PCT/CN2013/080004
§ 371 (c)(1),
(2) Date: May 14, 2015

(87) PCT Pub. No.: WO2014/015802
PCT Pub. Date: Jan. 30, 2014

(65) Prior Publication Data
US 2015/0247749 A1 Sep. 3, 2015

(30) Foreign Application Priority Data

Jul. 24, 2012 (CN) .......................... 2012 1 0257891
Jul. 24, 2012 (CN) ...................... 2012 2 0360533 U

(51) Int. Cl.
*G01F 1/00* (2006.01)
*G01F 7/00* (2006.01)
(Continued)

(52) U.S. Cl.
CPC ................ *G01F 3/30* (2013.01); *G01F 1/363* (2013.01); *G01F 1/74* (2013.01); *G01F 1/88* (2013.01)

(58) Field of Classification Search
CPC . G01F 1/36; G01F 1/74; G01F 1/7082; G01F 1/712
(Continued)

(56) References Cited

U.S. PATENT DOCUMENTS

| 7,661,302 | B2 * | 2/2010 | Gysling | .................... G01F 1/36 73/200 |
| 9,031,797 | B2 * | 5/2015 | Huang | .................... G01F 1/663 702/48 |
| 2011/0301877 | A1 * | 12/2011 | Wee | ........................ G01F 1/363 702/47 |

FOREIGN PATENT DOCUMENTS

CN 2277514 4/1998
CN 1963403 A 5/2007
(Continued)

*Primary Examiner* — An Do
(74) *Attorney, Agent, or Firm* — Morgan, Lewis & Bockius LLP; Jeffry S. Mann

(57) ABSTRACT

A wet gas flow measuring method, wherein measuring total flow differential pressure value ΔP of wet gas in a pipeline by a differential pressure flow measuring device (201), measuring section gas contents of the wet gas in the pipeline by at least two phase fraction meters respectively (202), obtaining optimized section gas content value GVFopt by a flow calculating module based on the section gas contents respectively measured by the at least two phase fraction meters (203); and calculating gas volume flow rate Qg and liquid volume flow rate Ql by the flow calculating module based on the total flow differential pressure value ΔP of the wet gas and the optimized section gas content value GVFopt (204). As the section gas content of the wet gas in the pipeline is detected by the redundant phase fraction meters, the gas volume flow rate Qg and the liquid volume flow rate Ql can be measured accurately, which meets the requirements on production measurements of oil and gas field and facilitates management improvement and production opti-
(Continued)

mization of oil-gas reservoir. A wet gas flow measuring apparatus is also provided.

14 Claims, 5 Drawing Sheets

(51) Int. Cl.
  *G01F 3/30* (2006.01)
  *G01F 1/36* (2006.01)
  *G01F 1/74* (2006.01)
  *G01F 1/88* (2006.01)
(58) Field of Classification Search
  USPC .............................................. 702/33, 45, 47
  See application file for complete search history.

(56) References Cited

FOREIGN PATENT DOCUMENTS

| | | |
|---|---|---|
| CN | 101255791 A | 9/2008 |
| CN | 102087298 A | 6/2011 |
| CN | 202093040 U | 12/2011 |
| CN | 102435245 A | 5/2012 |
| CN | 102749111 A | 10/2012 |
| CN | 102749111 B | 12/2013 |

* cited by examiner

WET GAS FLOW MEASURING METHOD AND APPARATUS

CROSS-REFERENCE TO RELATED APPLICATIONS

This application is a 371 of PCT/CN2013/080004 filed Jul. 24, 2013 which claims benefit of CN 201220360533.7 filed on Jul. 24, 2012 and CN 201210257891.X filed Jul. 24, 2012, all of which are incorporated herein by reference in their entireties.

FIELD OF THE INVENTION

The invention relates to a field of measurement, particularly, to a method for measuring wet gas flow and apparatus thereof.

BACKGROUND OF THE INVENTION

Wet gas refers to natural gas wherein amounts of liquid hydrocarbons, water vapor, and free water are significantly higher than those required by pipeline conveying. Alternatively, wet gas can be simply defined as a gas which contains some liquid, wherein the amount of liquid can vary from a small amount of water or hydrocarbon to substantial amount of water and hydrocarbon. Generally wet gas is defined as gas/liquid system with a Lockhart-Martinelli parameter smaller than approximately 0.3. During the exploring of a gas field, the metering of wet gas is involved in individual processes from exploring single-well to integral-delivery of multi-well, purification treatment, and pressured delivery. Metering data of wet gas can facilitate to know about production ability and production conditions of gas wells, and is the primary basis for optimizing the production and improving managements to gas reservoir.

Currently, wet gas metering techniques in the art primarily include two sorts, wherein one sort is a separation metering method, and another sort is the online metering method without any separation.

The separation metering method is to utilize a separator to separate a wet gas fluid into a gas phase fluid and a liquid phase fluid, and then to respectively meter the flows of the gas phase and the liquid phase at respective outlet thereof. However, the separation effect of the separator on wet gas is poor, and due to the phenomena of liquid carry-over and gas carry-under, the error of the metering result is high. Secondly, the structure and the flow process of the separator are complex, and thus the maintenances and managements to the system are complex with many links which should be controlled. Thus, fee for maintaining the operation of the system is high, and the metering process is disadvantageous to realize automatic managements to production process.

The online metering method without any separation for wet gas can have two developing trends. The first developing trend relates to the use a single-phase gas flow meter (e.g., a Coriolis mass flow meter, a V-cone flow meter, an orifice plate flow meter, a turbine flow meter, a ultrasonic flow meter, a Venturi flow meter, a vortex flow meter, etc.) to meter wet gas, and is committed to study and develop various experiential models to find out "correction coefficients", thereby to correct metered results, so that a so-called gas flow rate value can be obtained. In such wet gas metering method, metering means for a liquid flow rate generally includes a sampling method or a tracing method. However, the limitations of this method and challenges confronted thereby mainly include the following aspects:

(1) the scope for which the "correction coefficient" of the gas flow rate is applicable is limited and depends on the liquid flow rate, and however, the method for measuring the liquid flow rate decides that its precision is not high even poor; and (2) the method utilizing the "correction coefficient" of the gas flow rate is limited to be used for wet gas having a very high gas content and a very low liquid phase content, and with the increase of liquid component content in the wet gas, the error of the method will become unacceptable.

The second developing trend relates to metering wet gas by following or modifying online metering technique of a multi-phase flow. FIG. 1 depicts an online metering scheme in the prior art, in which a differential pressure type flow measuring device 2 is used to measure the total flow differential pressure value of wet gas in pipeline 1; a phase fraction meter 3 arranged in the pipeline 1 is used to measure the gas void fraction of the wet gas in the pipeline 1; and a flow calculating module 4, based on the total flow differential pressure value and gas void fraction of the wet gas, can be used to calculate the gas volume flow rate Qg and the liquid volume flow rate Ql.

Since only one phase fraction meter is arranged in the pipeline 1, and the phase fraction meter per se involve a "drift" (e.g., the counting drift of a gamma-phase fraction meter), metering errors will be produced. Thus, precise metering to the gas void fraction of wet gas in a pipeline cannot be achieved.

SUMMARY OF THE INVENTION

Figure 1:
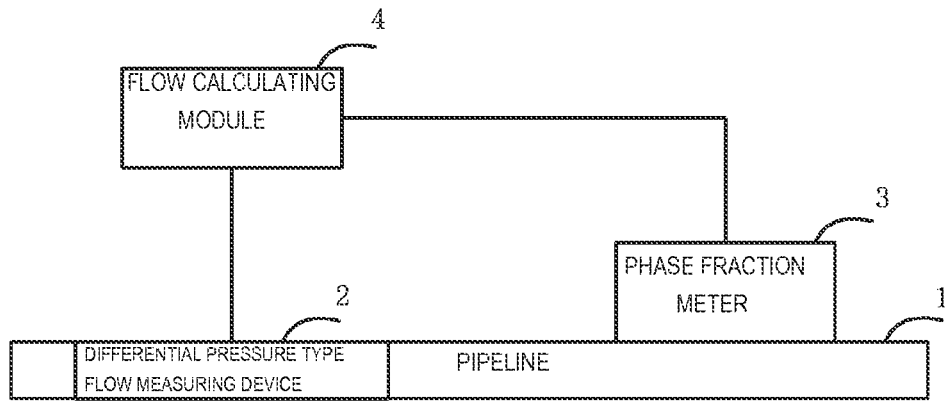
FIG. 1 is a diagram which describes a scheme for measuring wet gas flow in the prior art.

The technical problem to be solved by the invention is to provide a method for measuring wet gas flow and apparatus thereof, i.e., as the gas void fraction of the wet gas in the pipeline is detected by a redundant phase fraction meter, the gas volume flow rate $Q_g$ and the liquid volume flow rate $Q_l$ can be measured accurately, which meets the requirements on production measurements of oil and gas field and facilitates management improvement and production optimization of oil-gas reservoir.

An aspect of the invention is to provide a method for measuring a wet gas flow, comprising the following steps: (a) measuring the total flow differential pressure value ΔP of wet gas in a pipeline via a differential pressure type flow measuring device; (b) measuring gas void fraction of the wet gas in the pipeline via at least two phase fraction meters, respectively; (c) obtaining optimized gas void fraction $GVF_{opt}$ by a flow calculating module based on the gas void fractions respectively measured by the at least two phase fraction meters; and (d) calculating the gas volume flow rate $Q_g$ and the liquid volume flow rate $Q_l$ by the flow calculating module based on the total flow differential pressure value $\Delta P$ and the optimized gas void fraction $GVF_{opt}$ of the wet gas.

Another aspect of the invention is to provide a wet gas flow measuring apparatus, comprising a pipeline, a differential pressure type flow measuring device, at least two phase fraction meters, and a flow calculating module, wherein the differential pressure type flow measuring device and said at least two phase fraction meters are respectively installed on the pipeline, and wherein: the pipeline is used to convey the wet gas; the differential pressure type flow measuring device is used to measure the total flow differential pressure value $\Delta P$ of wet gas in the pipeline; the at least two phase fraction meters are respectively used to measure the gas void fractions of wet gas in the pipeline; and the flow calculating module is used to calculate the optimized gas void fraction $GVF_{opt}$ based on the gas void fractions respectively measured by the at least two phase fraction meters; and the flow calculating module is used to calculate the gas volume flow rate $Q_g$ and the liquid volume flow rate $Q_l$ based on the total flow differential pressure value $\Delta P$ and the optimized gas void fraction $GVF_{opt}$.

In accordance with the invention, a differential pressure type flow measuring device is used to measure the total flow differential pressure value of wet gas in a pipeline; at least two phase fraction meters are respectively used to measure the gas void fractions of wet gas in the pipeline; a flow calculating module, based on the gas void fractions respectively measured by the at least two phase fraction meters, can be used to calculate the optimized gas void fraction GVFopt, and the flow calculating module, based on the total flow differential pressure value $\Delta P$ and the optimized gas void fraction GVFopt, can be used to calculate the gas volume flow rate Qg and the liquid volume flow rate Ql. As the gas void fraction of the wet gas in the pipeline is detected by a redundant phase fraction meter, the gas volume flow rate Qg and the liquid volume flow rate Ql can be measured accurately, which meets the requirements on production measurements of oil and gas field and facilitates management improvement and production optimization of oil-gas reservoir.

DETAILED DESCRIPTION OF THE INVENTION

By referring to the drawings, more all-around descriptions to the invention are made as follow, where exemplary examples of the invention are set forth.

Figure 2:
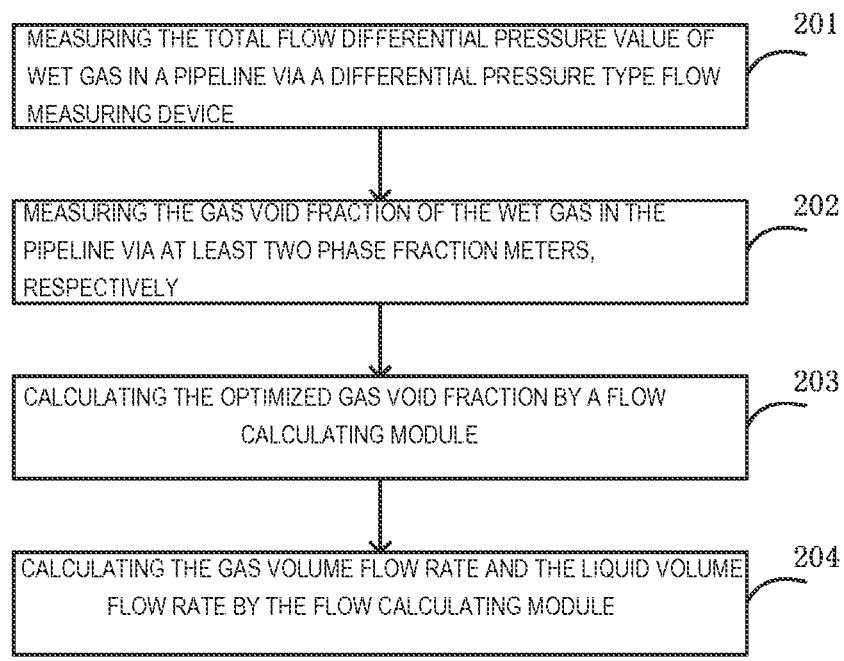
FIG. 2 is a diagram which describes an example for the wet gas flow measuring method of the invention.

FIG. 2 is a diagram which describes one example for the wet gas flow measuring method of the invention, and as shown in FIG. 2, the wet gas flow measuring method in the embodiment may comprise the following steps:

Step 201, measuring the total flow differential pressure value $\Delta P$ of wet gas in a pipeline via a differential pressure type flow measuring device;

Step 202, measuring the gas void fraction of the wet gas in the pipeline via at least two phase fraction meters, respectively;

Step 203, obtaining optimized gas void fraction $GVF_{opt}$ by a flow calculating module based on the gas void fractions respectively measured by the at least two phase fraction meters; and;

Step 204, calculating the gas volume flow rate $Q_g$ and the liquid volume flow rate $Q_l$ by the flow calculating module based on the total flow differential pressure value $\Delta P$ and the optimized gas void fraction $GVF_{opt}$ of the wet gas.

In accordance with the wet gas flow measuring method as provided in the above example of the invention, a differential pressure type flow measuring device is used to measure the total flow differential pressure value $\Delta P$ of wet gas in a pipeline; at least two phase fraction meters are respectively used to measure the gas void fractions of wet gas in the pipeline; a flow calculating module, based on the gas void fractions respectively measured by the at least two phase fraction meters, can be used to calculate the optimized gas void fraction $GVF_{opt}$, and the flow calculating module, based on the total flow differential pressure value $\Delta P$ and the optimized gas void fraction $GVF_{opt}$, can be used to calculate the gas volume flow rate $Q_g$ and the liquid volume flow rate $Q_l$. As the gas void fraction of the wet gas in the pipeline is detected by a redundant phase fraction meter, the gas volume flow rate $Q_g$ and the liquid volume flow rate $Q_l$ can be measured accurately, which meets the requirements on production measurements of oil and gas field and facilitates management improvement and production optimization of oil-gas reservoir.

It is preferred that the axial lines of the at least two phase fraction meters are respectively intersected with the axial direction of the pipeline and perpendicular thereto. Since the axial line of each phase fraction meter is respectively intersected with the axial direction of the pipeline and perpendicular thereto, the precision of measuring result can be further assured.

Figure 3:
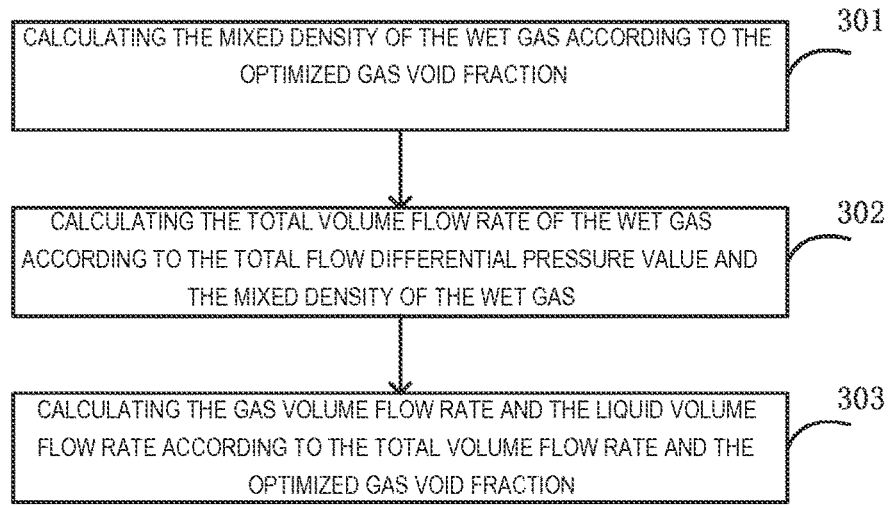
FIG. 3 is a diagram which describes an example for calculating the gas volume flow rate and the liquid volume flow rate of the invention.

It is preferred that in above step 204, the method as shown in FIG. 3 may be used to calculate the gas volume flow rate $Q_g$ and the liquid volume flow rate $Q_l$. A person skilled in the art will know that the method as shown in FIG. 3 merely is illustrative, and thus a person skilled in the art can use other alternative methods to take the calculation. As shown in FIG. 3, the method according to the invention for calculating the gas volume flow rate $Q_g$ and the liquid volume flow rate $Q_l$ comprises the following steps:

Step 301, calculating the mixed density $\rho_{mix}$ of wet gas according to the optimized gas void fraction $GVF_{opt}$;

Step 302, calculating the total volume flow rate $Q$ of wet gas according to the total flow differential pressure value $\Delta P$ and mixed density $\rho_{mix}$ of wet gas; and Step 303, calculating the gas volume flow rate $Q_g$ and the liquid volume flow rate $Q_l$ according to the total volume flow rate $Q$ and the optimized gas void fraction $GVF_{opt}$.

Preferably, in the step 301, the following equation can be used to calculate the mixed density $\rho_{mix}$ of wet gas: $\rho_{mix} = \rho_{gas} GVF_{opt} + \rho_{liquid}(1 - GVF_{opt})$, wherein $\rho_{gas}$ denotes the gas density, and $\rho_{liquid}$ denotes the liquid density.

Preferably, in the step 302, the following equation can be used to calculate the total volume flow rate $Q$ of wet gas:

$$Q = K\sqrt{\frac{\Delta P}{\rho_{mix}}},$$

wherein the parameter K is a systematic parameter.

Preferably, in the step 303, the equation $Q_g=Q\times GVF_{opt}$ can be used to calculate the gas volume flow rate $Q_g$; and the equation $Q_l=Q\times(1-GVF_{opt})$ can be used to calculate the liquid volume flow rate $Q_l$.

A person skilled in the art will know that the specific equations used in the above steps 301-303 are merely illustrative, and thus a person skilled in the art can use other alternative equations to take the calculations.

In the above step 203, the flow calculating module, with a method for acquiring a mean value, can calculate the optimized gas void fraction $GVF_{opt}$ by acquiring the mean value of the above gas void fractions which are respectively measured by at least two phase fraction meters. For example, the calculation can be carried out with a method for calculating an arithmetic mean value, a geometric mean volume, or a root mean square mean value.

Figure 4:
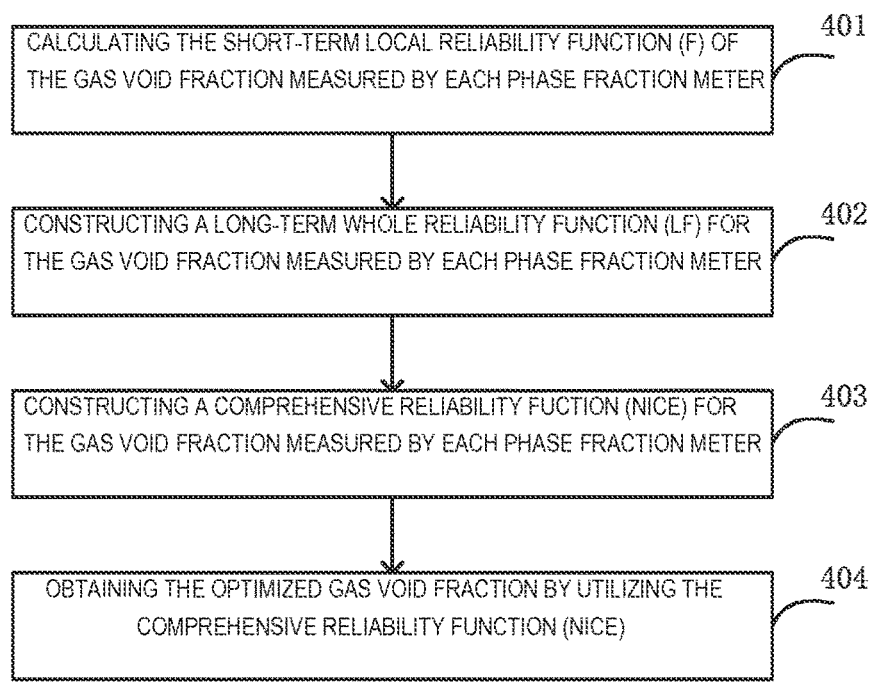
FIG. 4 is a diagram which describes an example for calculating the optimized gas void fraction of the invention.

Preferably, in step 203, the flow calculating module can calculate the optimized gas void fraction $GVF_{opt}$ by a method for calculating a weighted mean value as shown in FIG. 4.

FIG. 4 is a diagram which describes an example of the invention for calculating the optimized gas void fraction by utilizing a weighed means value. As shown in FIG. 4, the method for calculating the optimized gas void fraction may comprises the following steps:

Step 401, calculating the short-term local reliability function F( ) of the gas void fraction Xi measured by each phase fraction meter: $F(X_i)=D(X_i)=E([X_i-E(X_i)]^2)$, wherein Xi denotes the time sequence of the gas void fractions measured by the phase fraction meter i, $1\le i\le N$; N denotes the number of phase fraction meters; D( ) denotes a variance function; and E( ) denotes an expectation function;

Step 402, constructing a long-term whole reliability function LEO for the gas void fraction Xi measured by each phase fraction meter:

$S_i[0]=X_i[0]$, $S_i[m]=\alpha S_i[m-1]+(1-\alpha)X_i[m]$, $LF(S_i)=D(S_i)$, wherein $0\le\alpha\le 1$, where this parameter a refers to a coefficient which denotes a weight; different weights may be set according to specific experimental conditions, and an optimized weight value can be found out by trial and error method; and $0\le m\le M-1$, where M denotes the number of the gas void fractions included in the time sequence, and $X_i[m]$ denotes the $m^{th}$ gas void fraction in the time sequence of the gas void fraction measured by the phase fraction meter i;

Step 403, constructing a comprehensive reliability function NICE( ) for the gas void fraction Xi measured by each phase fraction meter by utilizing the short-term local reliability function F( ) and the long-term whole reliability function LF( ):

$$NICE(X_i) = \frac{1}{F(X_i)+LF(S_i)}.$$

Step 404, obtaining the optimized gas void fraction $GVF_{opt}$ by utilizing the comprehensive reliability function NICE( ):

$$GVF_{opt}[m] = \frac{\sum_{i=1}^{N} X_i[m]NICE(X_i)}{\sum_{i=1}^{N} NICE(X_i)},$$

wherein $GVF_{opt}[m]$ denotes the $m^{th}$ optimized value in the time sequence of the optimized gas void fraction $GVF_{opt}$.

A person skilled in the art can know that in a specific example, the comprehensive reliability function NICE( ) is deemed as the weight.

A person skilled in the art can know that the method as shown in FIG. 4 merely is illustrative, and the person skilled in the art can use other alternative methods to take the calculation. For example, when calculating a weight mean value, other methods can be used to obtain the weight value, and the forms of the weight value are not limited to it. Meantime, a weight value to which a signal having a high quality corresponds is relatively high.

Figure 5:
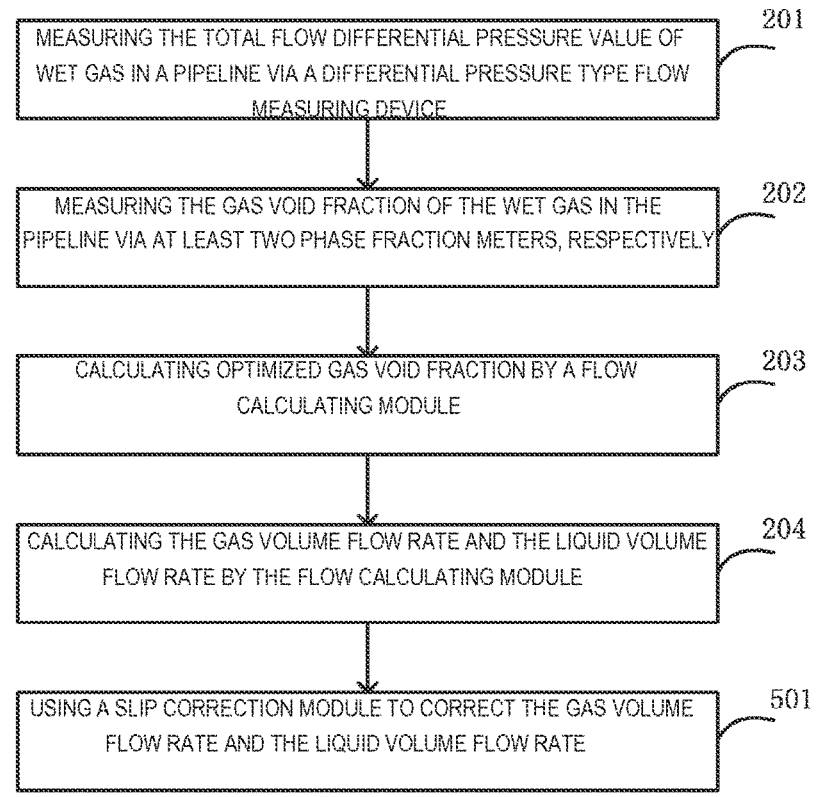
FIG. 5 is a diagram which describes another example for the wet gas flow measuring method of the invention.

FIG. 5 is a diagram which describes another example for the wet gas flow measuring method of the invention. As compared with the example as shown in FIG. 2, the example as shown in FIG. 5 further comprises the step 501 of the slip correction for the gas volume flow rate $Q_g$ and the liquid volume flow rate $Q_l$ after they are obtained in the step 204.

It is preferred to use a calculating method for the precise slip analytic solution of a gas and liquid annular mist flow to conduct the slip correction to the gas volume flow rate $Q_g$ and the liquid volume flow rate $Q_l$. The method is described specifically as follows:

In step 501, a slip correction module is used to correct the gas volume flow rate $Q_g$ and the liquid volume flow rate $Q_l$, so as to acquire a corrected gas volume flow rate $Q'_g$ and a corrected liquid volume rate $Q'_l$:

$$Q'_l = \frac{Q_l}{(1-GVF_{opt}+Slip*GVF_{opt})},$$

$$Q'_g = \frac{Q_g*Slip}{(1-GVF_{opt}+Slip*GVF_{opt})},$$

wherein the equation for calculating the slip factor is shown as follows:

$$Slip = \frac{(1-d)\left(\frac{1}{\mu'_k}\frac{d}{\varepsilon}-2\left(\frac{d}{\varepsilon}-1\right)\right)}{\left(1-\frac{d}{\varepsilon}\right)^2+(1-\varepsilon)\left(\frac{1}{\mu'_k}\left(\frac{d}{\varepsilon}\right)^2-2\left(\left(\frac{d}{\varepsilon}\right)^2-\frac{d}{\varepsilon}\right)\right)},$$

where $\varepsilon\in[d, 1]$, $d=\varepsilon\times(r^2/R^2)$, wherein r denotes the radius of the gas phase column; R denotes the radius of the pipeline; $\mu'_k=\varepsilon\mu_k-\varepsilon+1$, wherein $\mu_k$ denotes the viscosity ratio of gas phase to liquid phase; $\varepsilon$ denotes the gas volume fraction in the gas core of the annular mist flow; d denotes the gas volume fraction at the section of the pipeline. In the equation, when $\varepsilon$ tends to d, the situation shows that the flow pattern of the wet gas is a pure mist flow without any liquid film, and at this time, there is no slip between gas phase and liquid phase and S=1. When $\varepsilon$ tends to 1, the situation shows that the flow pattern of the wet gas is a liquid and gas annular flow. When the flow pattern of wet gas is found between the pure mist flow and the gas and liquid annular flow model, $\varepsilon$ takes a certain value between d and 1, and the value can be experientially selected by a person skilled in the art.

Since a difference between the velocities of gas phase and liquid phase (i.e., the slip) can result in some errors, a solution which is usually used in the art for solving the technical problem is to fit relevant experimental data so as to correct the gas flow rate and the liquid flow rate. However, the disadvantage of the correction resides in strong dependences of experiential models on experimental data and measuring conditions, so that the method cannot achieve the balance of the universality and the precision. The defect in the prior art can be overcome by utilizing the slip correction method provided by the present invention, i.e., the precise analytic solution for the slip of gas and liquid annular mist flow, to correct the gas volume flow rate $Q_g$ and the liquid volume flow rate $Q_l$, thereby to further increase measuring precisions.

Preferably, in the example as shown in FIG. 5, the step 203 also can be carried out according to the example as show in FIG. 4, and the step 204 can be carried out according to the example as show in FIG. 3.

Figure 6:
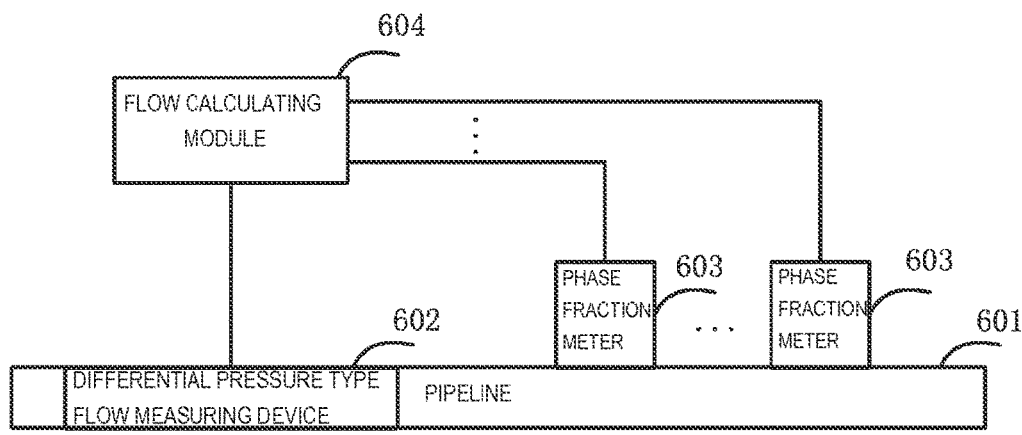
FIG. 6 is a diagram which describes an example for the wet gas flow measuring apparatus of the invention.

FIG. 6 is a diagram which describes an example for the wet gas flow measuring apparatus of the invention. As show in FIG. 6, the wet gas flow measuring apparatus in the embodiment comprises a pipeline 601, a differential pressure type flow measuring device 602, at least two phase fraction meters 603, and a flow calculating module 604, wherein the differential pressure type flow measuring device 602 and said at least two phase fraction meters 603 are respectively installed on the pipeline, and wherein the pipeline 601 is used to convey the wet gas; the differential pressure type flow measuring device 602 is used to measure the total flow differential pressure value of wet gas in the pipeline; at least two phase fraction meters 603 are respectively used to measure the gas void fractions of wet gas in the pipeline; a flow calculating module 604, according to the gas void fractions respectively measured by the at least two phase fraction meters 603, can be used to calculate the optimized gas void fraction $GVF_{opt}$, and the flow calculating module 604, according to the total flow differential pressure value $\Delta P$ and the optimized gas void fraction $GVF_{opt}$, can be used to calculate the gas volume flow rate $Q_g$ and the liquid volume flow rate $Q_l$.

By utilizing the wet gas flow measuring apparatus provided in the above example in accordance with the invention, a differential pressure type flow measuring device is used to measure the total flow differential pressure value of wet gas in a pipeline; at least two phase fraction meters are respectively used to measure the gas void fractions of wet gas in the pipeline; a flow calculating module, according to the gas void fractions respectively measured by the at least two phase fraction meters, can be used to calculate the optimized gas void fraction $GVF_{opt}$, and the flow calculating module, according to the total flow differential pressure value $\Delta P$ and the optimized gas void fraction $GVF_{opt}$, can be used to calculate the gas volume flow rate $Q_g$ and the liquid volume flow rate $Q_l$. As the gas void fraction of the wet gas in the pipeline is detected by a redundant phase fraction meter, the gas volume flow rate $Q_g$ and the liquid volume flow rate $Q_l$ can be measured accurately, which meets the requirements on production measurements of oil and gas field and facilitates management improvement and production optimization of oil-gas reservoir.

It is preferred that the axial lines of the at least two phase fraction meters are respectively intersected with the axial direction of the pipeline and perpendicular thereto. Since the axial line of each phase fraction meter is respectively intersected with the axial direction of the pipeline and perpendicular thereto, the precision of measuring result can be further assured.

Preferably, said at least two phase fraction meters may either be installed on the same one section, or be installed on different sections of the pipeline.

Preferably, the flow calculating module 604, in particular, according to the optimized gas void fraction $GVF_{opt}$, can calculate the mixed density $\rho_{mix}$ of wet gas; it, according to the total flow differential pressure value $\Delta P$ and the mixed density $\rho_{mix}$ of wet gas, can calculate the total volume flow rate $Q$ of wet gas; and it, according to the total volume flow rate $Q$ and the optimized gas void fraction $GVF_{opt}$, can calculate the gas volume flow rate $Q_g$ and the liquid volume flow rate $Q_l$.

Preferably, the flow calculating module 604 specifically uses the following equation $\rho_{mix}=\rho_{gas}GVF_{opt}+\rho_{liquid}(1-GVF_{opt})$ to calculate the mixed density $\rho_{mix}$ of wet gas, wherein $\rho_{gas}$ denotes the gas density, and $\rho_{liquid}$ denotes the liquid density.

Preferably, the flow calculating module 604 specifically uses the equation $$Q = K\sqrt{\frac{\Delta P}{\rho_{mix}}}$$

to calculate the total volume flow rate $Q$ of wet gas, wherein the parameter $K$ is a systematic parameter.

Preferably, the flow calculating module 604 uses the equation $Q_g=Q\times GVF_{opt}$ to calculate the gas volume flow rate $Q_g$, and uses the equation $Q_g=Q\times(1-GVF_{opt})$ to calculate the liquid volume flow rate $Q_l$.

The flow calculating module 604, with a method for acquiring a mean value, can calculate the optimized gas void fraction $GVF_{opt}$ by calculating the mean value of the above gas void fractions which are respectively measured by at least two phase fraction meters. For example, the calculation can be carried out with a method for calculating an arithmetic mean value, a geometric mean value, or a root mean square mean value, etc.

Preferably, the flow calculating module 604 further can utilize a method for calculating a weighed mean value to calculate the optimized gas void fraction $GVF_{opt}$. The flow calculating module 604 specifically calculates the short-term local reliability function $F(\ )$ of the gas void fraction Xi measured by each phase fraction meter: $F(X_i)=D(X_i)=E([X_i-E(X_i)]^2)$, wherein $X_i$ denotes the time sequence of the gas void fraction measured by the phase fraction meter i, $1 \leq i \leq N$; N denotes the number of the phase fraction meters; $D(\ )$ denotes a variance function; and $E(\ )$ denotes an expectation function.

The flow calculating module 604 specifically constructs a long-term whole reliability function LEO for the gas void fraction $X_i$ measured by each phase fraction meter:

$S_i[0]=X_i[0]$ $S_i[m]=\alpha S_i[m-1]+(1-\alpha)X_i[m]$ $LF(S_i)=D(S_i)$, which $0 \leq \alpha \leq 1$, where this parameter $\alpha$ refers to a coefficient which denotes a weight; different weights may be set according to specific experimental conditions, and an optimized weight value can be found out by trial and error method; $0 \leq m \leq M-1$, wherein M denotes the number of the gas void fractions included in the time sequence, and $X_i[m]$ denotes the $m^{th}$ gas void fraction in the time sequence of the gas void fraction measured by the phase fraction meter i.

The flow calculating module 604 constructs a comprehensive reliability function $NICE(\ )$ of the gas void fraction $X_i$ measured by each phase fraction meter by utilizing the short-term local reliability function $F(\ )$ and the long-term whole reliability function $LE(\ )$:

$$NICE(X_i) = \frac{1}{F(X_i) + LF(S_i)}.$$

The flow calculating module 604 specifically utilizes the comprehensive reliability function NICE( ) to obtain the optimized gas void fraction $GVF_{opt}$:

$$GVF_{opt}[m] = \frac{\sum_{i=1}^{N} X_i[m]NICE(X_i)}{\sum_{i=1}^{N} NICE(X_i)},$$

wherein $GVF_{opt}[m]$ denotes the $m^{th}$ optimized value in the time sequence of the optimized gas void fraction $GVF_{opt}$.

Figure 7:
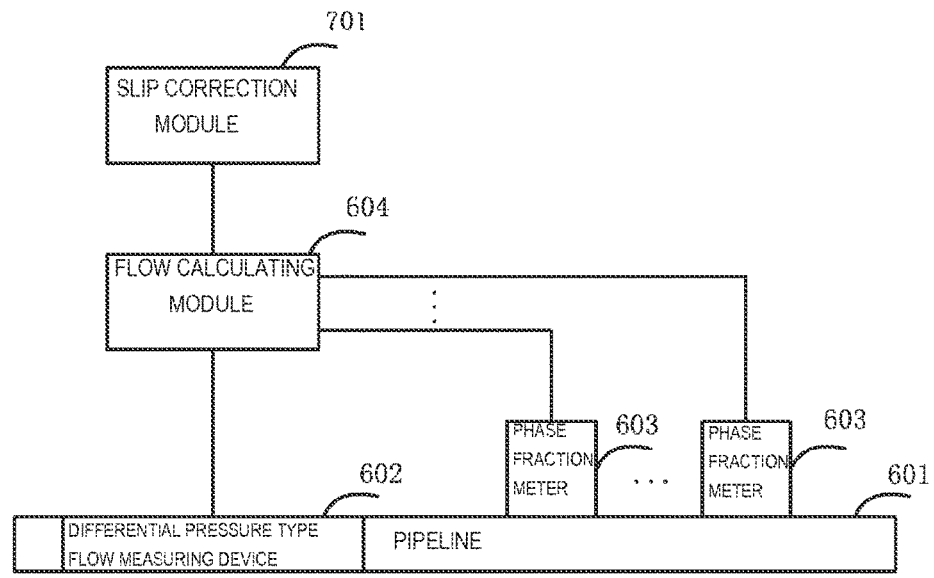
FIG. 7 is a diagram which describes another example for the wet gas flow measuring apparatus of the invention.

FIG. 7 is a diagram which describes another example for the wet gas flow measuring apparatus of the invention. As compared with the example as shown in FIG. 6, the wet gas flow measuring apparatus further comprises a slip correction module 701 for the correction of the gas volume flow rate $Q_g$ and the liquid volume flow rate $Q_l$ so as to acquire a corrected gas volume flow rate $Q'_g$ and a corrected liquid volume rate $Q'_l$:

$$Q'_l = \frac{Q_l}{(1 - GVF_{opt} + \text{Slip} * GVF_{opt})},$$

$$Q'_g = \frac{Q_g * \text{Slip}}{(1 - GVF_{opt} + \text{Slip} * GVF_{opt})},$$

wherein the equation for calculating the slip factor is shown as follows:

$$\text{Slip} = \frac{(1-d)\left(\frac{1}{\mu'_k}\frac{d}{\varepsilon} - 2\left(\frac{d}{\varepsilon} - 1\right)\right)}{\left(1 - \frac{d}{\varepsilon}\right)^2 + (1-\varepsilon)\left(\frac{1}{\mu'_k}\left(\frac{d}{\varepsilon}\right)^2 - 2\left(\left(\frac{d}{\varepsilon}\right)^2 - \frac{d}{\varepsilon}\right)\right)}.$$

Where $\varepsilon \in [d, 1]$, $d = \varepsilon \times (r^2/R^2)$, wherein r denotes the radius of the gas phase column; R denotes the radius of the pipeline; $\mu'_k = \varepsilon \mu_k - \varepsilon + 1$, wherein $\mu_k$ denotes the viscosity ratio of gas phase to liquid phase; $\varepsilon$ denotes the gas volume fraction in the gas core of the annular mist flow; d is the gas volume fraction at the section of the pipeline. In the equation, when $\varepsilon$ tends to d, the situation shows that the flow pattern of the wet gas is a pure mist flow without any liquid film, and at this time, there is no slip between gas phase and liquid phase and S=1. When $\varepsilon$ tends to 1, the situation shows that the flow pattern of the wet gas is a liquid and gas annular flow. When the flow pattern of the wet gas is found between the pure mist flow and the gas and liquid annular flow model, $\varepsilon$ takes a certain value between d and 1, and the value can be experientially selected by a person skilled in the art.

Figure 8:
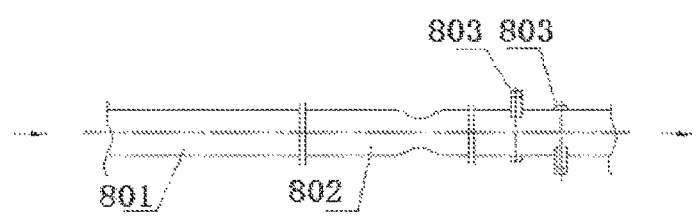
FIG. 8 is a diagram which describes an example for horizontal arrangement of the wet gas flow measuring apparatus of the invention.
Figure 9:
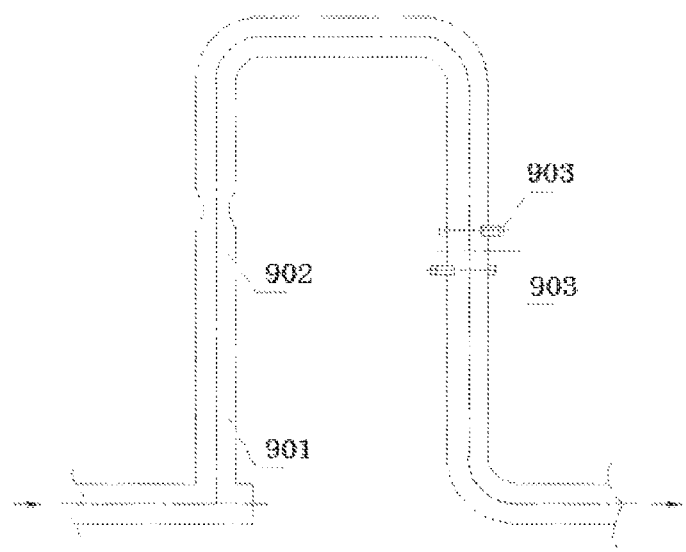
FIG. 9 is a diagram which describes an example for vertical arrangement of the wet gas flow measuring apparatus of the invention.

It is preferred that the wet gas flow measuring apparatus may be horizontally or vertically installed. FIG. 8 is a diagram which describes an example for horizontal arrangement of the wet gas flow measuring apparatus of the invention. In FIG. 8, the arrow represents the flowing direction of wet gas; sign 801 denotes the pipeline; sign 802 denotes a differential pressure type flow measuring device; sign 803 denotes the phase fraction meter (for the aim of simplifying the figure, merely two phase fraction meters are illustrated). FIG. 9 is a diagram which describes an example for vertical arrangement of the wet gas flow measuring apparatus of the invention. In FIG. 9, the arrow represents the flowing direction of the wet gas; the sign 901 denotes the pipeline; sign 902 denotes a differential pressure type flow measuring device; sign 903 denotes the phase fraction meter (for the aim of simplifying the figure, merely two phase fraction meters are illustrated).

Preferably, on the pipeline, a pressure transmitter and a temperature transmitter are further installed for measuring pressure and temperature in the pipeline respectively, thereby to facilitate management improvement and production optimization of oil-gas reservoir.

The descriptions to the invention are made aimed for exemplifying and describing the invention, but not for exclusive or limiting the invention to the disclosures. Thus, many modification and variations are obvious for a person skilled in the art. To select and describe the examples is aimed to better set forth the theory and actual applications of the invention, and so, a person skilled in the art can understand the invention so that various examples with various modifications can be designed to be adapted for certain uses.

The invention claimed is:

1. A method for measuring wet gas flow, characterized in that the method comprises the steps of:
    (a) measuring the total flow differential pressure value ΔP of wet gas in a pipeline via a differential pressure type flow measuring device disposed on the pipeline;
    (b) measuring gas void fraction of the wet gas in the pipeline via at least two phase fraction meters disposed on the pipeline downstream from the differential pressure type flow measuring device, respectively;
    (c) obtaining optimized gas void fraction $GVF_{opt}$ by a flow calculating module based on the gas void fractions respectively measured by the at least two phase fraction meters; and
    (d) calculating the gas volume flow rate $Q_g$ and the liquid volume flow rate $Q_l$ by the flow calculating module based on the total flow differential pressure value ΔP and the optimized gas void fraction $GVF_{opt}$ of the wet gas;

characterized in that:
the step (c) comprises the following steps:
    (c1) calculating the short-term local reliability function F( ) of the gas void fraction Xi measured by each phase fraction meter: $F(X_i)=D(X_i)=E([X_i-E(X_i)]^2)$, wherein
        Xi denotes the time sequence of the gas void fraction measured by the phase fraction meter i, $1 \leq i \leq N$;
        N denotes the number of phase fraction meters;
        D( ) denotes a variance function; and
        E( ) denotes an expectation function;
    (c2) constructing a long-term whole reliability function LF( ) for the gas void fraction Xi measured by each phase fraction meter:

$S_i[0]=X_i[0]$, $S_i[m]=\alpha S_i[m-1]+(1-\alpha)X_i[m]$, $LF(S_i)=D(S_i)$, wherein $0 \leq \alpha \leq 1$, and $0 \leq m \leq M-1$, where M denotes the number of the gas void fractions included in the time sequence, and $X_i[m]$ denotes the $m^{th}$ gas void fraction in the time sequence of the gas void fraction measured by the phase fraction meter i;

(c3) constructing a comprehensive reliability function NICE( ) for the gas void fraction Xi measured by each phase fraction meter by utilizing the short-term local reliability function F( ) and the long-term whole reliability function LF( ):

$$NICE(X_i) = \frac{1}{F(X_i) + LF(S_i)};$$

and
(c4) obtaining the optimized gas void fraction $GVF_{opt}$ by utilizing the comprehensive reliability function NICE( )

$$GVF_{opt}[m] = \frac{\sum_{i=1}^{N} X_i[m]NICE(X_i)}{\sum_{i=1}^{N} NICE(X_i)},$$

wherein $GVF_{opt}[m]$ denotes the $m^{th}$ optimized value in the time sequence of the optimized gas void fraction $GVF_{opt}$.

2. The method according to claim 1, characterized in that: the axial lines of said at least two phase fraction meter are respectively intersected with and perpendicular to the axial direction of the pipeline.

3. The method according to claim 1, characterized in that: the step (d) comprises the following steps:
(d1) calculating the mixed density $\rho_{mix}$ of the wet gas according to the optimized gas void fraction $GVF_{opt}$;
(d2) calculating the total volume flow rate Q of the wet gas according to the total flow differential pressure value ΔP and the mixed density $\rho_{mix}$; and
(d3) calculating the gas volume flow rate $Q_g$ and the liquid volume flow rate $Q_l$ according to the total volume flow rate Q and the optimized gas void fraction $GVF_{opt}$.

4. The method according to claim 3, characterized in that: the step (d1) comprises utilizing the equation $\rho_{mix} = \rho_{gas} GVF_{opt} + \rho_{liquid}(1-GVF_{opt})$ to calculate the mixed density $\rho_{mix}$ of the wet gas, wherein $\rho_{gas}$ denotes the gas density, and $\rho_{liquid}$ denotes the liquid density.

5. The method according to claim 3, characterized in that the step (d2) comprises utilizing the equation $$Q = K\sqrt{\frac{\Delta P}{\rho_{min}}}$$

to calculate the flow volume flow rate Q of the wet gas, wherein the parameter K is a systematic parameter.

6. The method according to claim 3, characterized in the step (d3) comprises the steps of:
calculating the gas volume flow rate $Q_g$ by utilizing the equation $Q_g = Q \times GVF_{opt}$; and
calculating the liquid volume flow rate $Q_l$ by utilizing the equation $Q_g = Q \times (1-GVF_{opt})$.

7. A wet gas flow measuring apparatus, comprising a pipeline, a differential pressure type flow measuring device, at least two phase fraction meters, and a flow calculating module, wherein the differential pressure type flow measuring device is disposed on the pipeline and said at least two phase fraction meters are disposed on the pipeline downstream from the differential pressure type flow measuring device and wherein:
the pipeline is used to convey the wet gas;
the differential pressure type flow measuring device is used to measure the total flow differential pressure value ΔP of wet gas in the pipeline;
the at least two phase fraction meters are respectively used to measure the gas void fractions of wet gas in the pipeline; and
the flow calculating module is used to calculate the optimized gas void fraction $GVF_{opt}$ based on the gas void fractions respectively measured by the at least two phase fraction meters; and the flow calculating module is used to calculate the gas volume flow rate $Q_g$ and the liquid volume flow rate $Q_l$ based on the total flow differential pressure value ΔP and the optimized gas void fraction $GVF_{opt}$;
characterized in that the flow calculating module calculates the short-term local reliability function F( ) of the gas void fraction Xi measured by each phase fraction meter: $F(X_i) = D(X_i) = E([X_i - E(X_i)]^2)$, wherein
Xi denotes the time sequence of the gas void fraction measured by the phase fraction meter i, 1≤i≤N;
N denotes the number of phase fraction meters;
D( ) denotes a variance function; and
E( ) denotes an expectation function;
the flow calculating module constructs a long-term whole reliability function LF( ) for the gas void fraction Xi measured by each phase fraction meter:

$$S_i[0] = X_i[0],$$

$$S_i[m] = \alpha S_i[m-1] + (1-\alpha) X_i[m],$$

$$LF(S_i) = D(S_i),$$

which 0≤α≤1, and 0≤m≤M−1, where M denotes the number of the gas void fractions included in the time sequence, and $X_{i[m]}$ denotes the $m^{th}$ gas void fraction in the time sequence of the gas void fraction measured by the phase fraction meter i;
the flow calculating module constructs a comprehensive reliability function NICE( ) of the gas void fraction Xi measured by each phase fraction meter by utilizing the short-term local reliability function F( ) and the long-term whole reliability function LF( ) wherein $$NICE(X_i) = \frac{1}{F(X_i) + LF(S_i)};$$

and
the flow calculating module utilizes the comprehensive reliability function NICE( ) to obtain the optimized gas void fraction $GVF_{opt}$:

$$GVF_{opt}[m] = \frac{\sum_{i=1}^{N} X_i[m]NICE(X_i)}{\sum_{i=1}^{N} NICE(X_i)},$$

wherein $GVF_{opt}[m]$ denotes the $m^{th}$ optimized value in the time sequence of the optimized gas void fraction $GVF_{opt}$.

8. The wet gas flow measuring apparatus according to claim 7, characterized in that the axial lines of said at least two phase fraction meters are intersected and perpendicular to the axial direction of the pipeline.

9. The wet gas flow measuring apparatus according to claim 7, characterized in that the flow calculating module calculates the mixed density $\rho mix$ of wet gas based on the optimized gas void fraction $GVF_{opt}$; and, the flow calculating module calculates the total volume flow rate Q of wet gas based on the total flow differential pressure value $\Delta P$ and the mixed density $\rho_{mix}$ of wet gas; and, the flow calculating module calculates the gas volume flow rate $Q_g$ and the liquid volume flow rate $Q_l$ based on the total volume flow rate Q and the optimized gas void fraction $GVF_{opt}$.

10. The wet gas flow measuring apparatus according to claim 9, characterized in that the flow calculating module utilizes the equation $\rho_{mix}=\rho_{gas}GVF_{opt}+\rho_{liquid}(1-GVF_{opt})$ to calculate the mixed density $\rho_{mix}$ of the wet gas, wherein $\rho_{gas}$ denotes the gas density, and $\rho_{liquid}$ denotes the liquid density.

11. The wet gas flow measuring apparatus according to claim 9, characterized in that the flow calculating module utilizes the equation $$Q = K\sqrt{\frac{\Delta P}{\rho_{min}}}$$

to calculate the total volume flow rate Q, wherein the parameter K is a systematic parameter.

12. The wet gas flow measuring apparatus according to claim 9, characterized in that the flow calculating module utilizes the equation Qg=Q×GVFopt to calculate the gas volume flow rate Qg and utilizes the equation Ql=Q×(1−GVFopt) to calculate the gas volume flow rate Ql.

13. The wet gas flow measuring apparatus according to claim 7, characterized in that said at least two phase fraction meters are installed on the same one section of the pipeline.

14. The wet gas flow measuring apparatus according to claim 7, characterized in that said at least two phase fraction meters are installed on different sections of the pipeline.

* * * * *